United States Patent [19]

Hirose

[11] Patent Number: 5,031,547
[45] Date of Patent: Jul. 16, 1991

[54] MECHANISM FOR MOVING A TABLE LENGTHWISE AND CROSSWISE AND FOR TURNING THE TABLE

[75] Inventor: Kazuya Hirose, Tokyo, Japan
[73] Assignee: Hihaisuto Seiko Kabushiki Kaisha, Tokyo, Japan
[21] Appl. No.: 334,208
[22] Filed: Mar. 24, 1989

[30] Foreign Application Priority Data

Mar. 24, 1988 [JP] Japan .................. 63-70625

[51] Int. Cl.$^5$ .................................. A47B 11/00
[52] U.S. Cl. .................. 108/140; 74/479; 108/137; 108/20; 248/425; 269/58; 33/1 M
[58] Field of Search ........ 108/102, 103, 104, 140, 108/20, 137, 143; 248/913, 396, 652, 654, 655, 425; 74/479; 33/1 M; 269/55, 58, 71

[56] References Cited

U.S. PATENT DOCUMENTS

| | | | |
|---|---|---|---|
| 3,270,591 | 9/1966 | Winter | 269/58 |
| 3,744,902 | 7/1973 | Henker | 33/1 M |
| 3,849,857 | 11/1974 | Murray | 248/913 |
| 4,118,869 | 10/1978 | Hartung et al. | 33/1 M |
| 4,193,317 | 3/1980 | Uono et al. | 108/20 |
| 4,408,830 | 10/1983 | Wutherich | 33/1 M |
| 4,602,555 | 7/1986 | Bushey | 108/20 |
| 4,784,377 | 11/1988 | Woodward | 269/71 |

Primary Examiner—Kenneth J. Dorner
Assistant Examiner—Gerald A. Anderson
Attorney, Agent, or Firm—Wenderoth, Lind & Ponack

[57] ABSTRACT

A mechanism for moving a table structure having a table as a part thereof in the lengthwise and crosswise direction and turning movement of the table, the mechanism having a support base, support bearing structure on the support base for supporting the table structure for movement in the lengthwise and crosswise direction and turning movement of the table, two mutually orthogonal pairs of parallel guide faces adapted to be mounted on the table structure, guide members on opposite sides of the table structure and engaged with the guide faces for controlling the movement of the table structure in the lengthwise and crosswise direction and turning movement of the table, and a moving device connected to at least some of the guide members for moving appropriate ones of the guide members for causing movement of the table structure along the other of the guide members in the lengthwise and crosswise direction of the table and in turning movement of the table.

10 Claims, 5 Drawing Sheets

MECHANISM FOR MOVING A TABLE LENGTHWISE AND CROSSWISE AND FOR TURNING THE TABLE

The present invention relates to a table used for precision measuring instruments, precision machines, supporting a specimen under a microscope in IC production, biotechnology, etc., and more specifically relates to a mechanism for moving said table lengthwise, crosswise, and in a turning direction thereof.

BACKGROUND OF THE INVENTION

In the conventional X-Y travelling table, a pair of monoaxial moving mechanisms, each of which is composed of a pair of straight motion guide bearings and one feed screw mechanism for causing movement in one direction, are superposed with their moving directions being orthogonal to cause a table to move lengthwise and crosswise thereof. When such a mechanism has a table turning mechanism added to this X-Y moving mechanism, this causes various problems, such as that the height from the support base to the table is so great as to make the mechanism relatively unstable and to cause it to occupy a large space, that the number of parts is large, that many man hours are required for assembling, that it is relatively difficult to assemble accurately, and so on.

OBJECT AND BRIEF SUMMARY OF THE INVENTION

The object of the present invention is to provide a mechanism which overcomes these conventional problems, and to this end the invention provides a mechanism comprising a support base, support bearing on the support base for supporting a table structure for movement in the lengthwise and crosswise direction and for turning movement, two mutually orthogonal pairs of parallel guide faces adapted to be mounted on the table structure, guide members on opposite sides of the table structure and engaged with the guide faces for controlling the movement of the table structure in the lengthwise and crosswise direction and for controlling the turning movement of the table, and a moving device connected to at least some of the guide members for moving appropriate ones of the guide members for causing movement of the table structure along the other of said guide members in the lengthwise and crosswise directions of the table and in the turning direction of the table.

BRIEF DESCRIPTION OF THE DRAWINGS

The invention will now be described in connection with the accompanying drawings, in which:

FIG. 1b is is a sectional view taken on line 1b—1b of FIG. 1a;

FIG. 2b is a sectional view of the mechanism of FIG. 2a taken on line 2b—2b of FIG. 2a;

DETAILED DESCRIPTION OF THE INVENTION

Figure 1A:
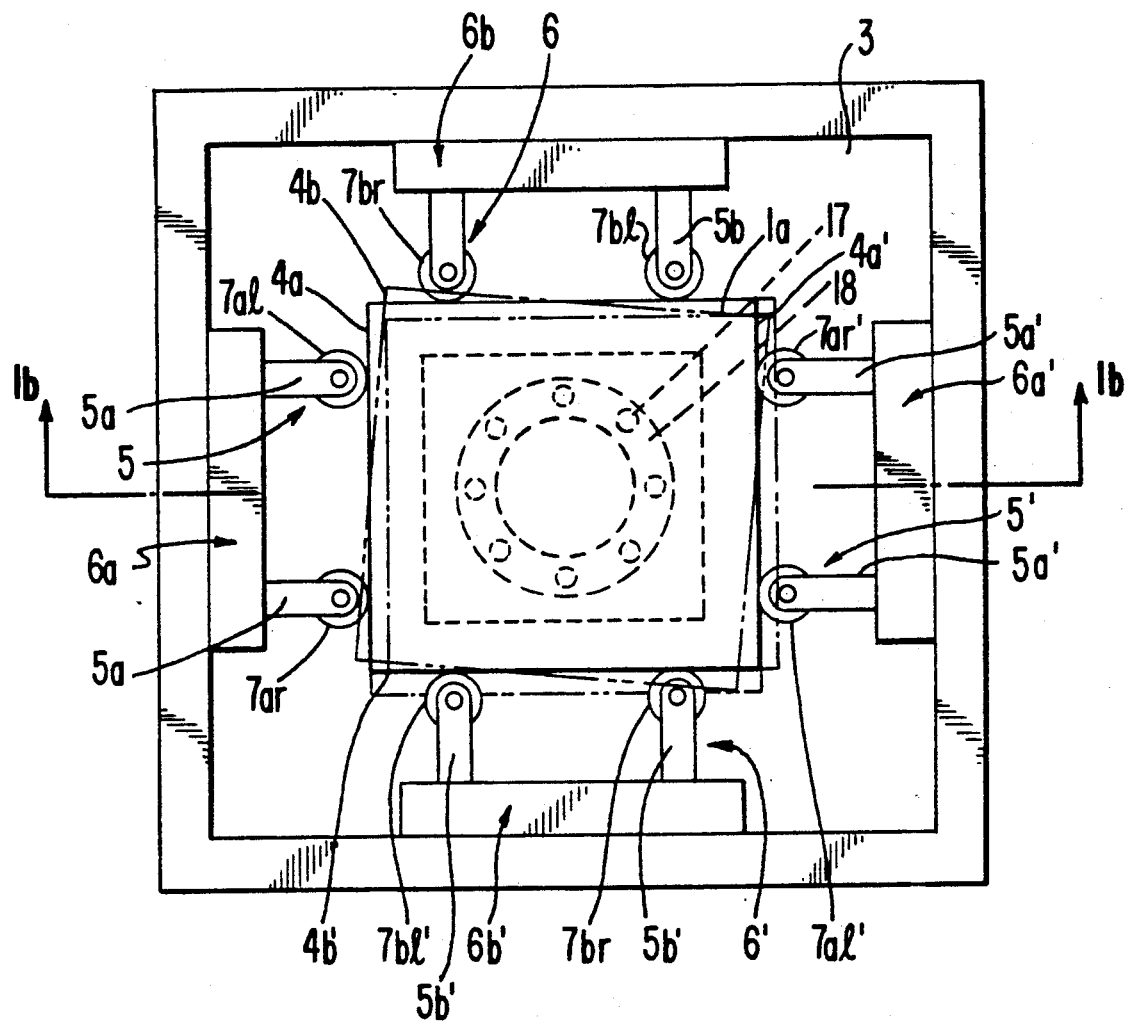
FIG. 1a is a plan view of a first embodiment of a mechanism according to the present invention.
Figure 1B:
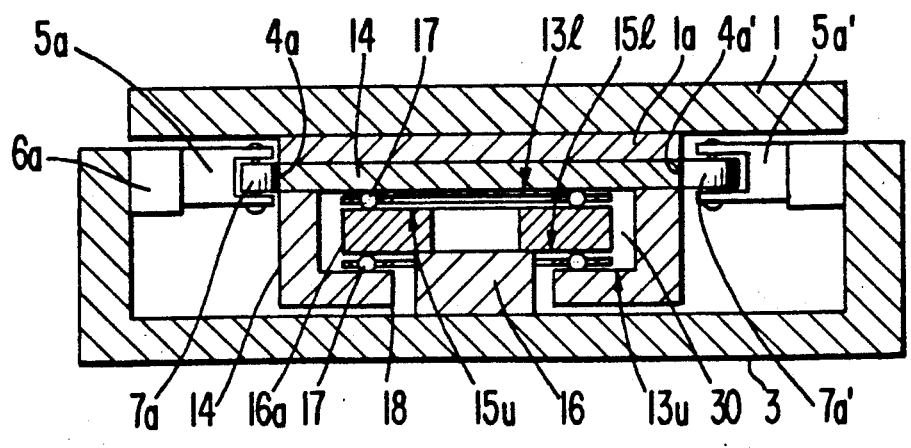

The first embodiment of the mechanism according to the present invention comprises mutually orthogonal pairs of parallel guide faces $4a$, $4a'$ and $4b$, $4b'$ adapted to be provided on a table means constituted by a table 1, shown in FIG. 1b, supported by a table base 1a. The table means is supported on a support base 3 by support bearing means 30 so as to be movable lengthwise and crosswise of the table, and also in a turning direction around an axis X through the center of the table and perpendicular thereto. The support bearing means 30 is constituted by a bearing support member 14 on the bottom of the table base 1a, and within which are two spaced opposed bearing faces $13l$ and $13u$. A post 16 on the support base extends into the hollow interior of the bearing support member 14 and has a flange 16a thereon, having upper and lower bearing surfaces $15u$ and $15l$ respectively. Roller bearings 17 held in bearing races 18 are provided between the opposed surfaces $13l$ and $15u$ and $15l$ and $13u$, respectively. The weight of the table means is supported on this support bearing means.

Pairs of guide members 5, 5' and 6, 6' are provided on opposite sides of the table means, each guide member being constituted by at least two guide elements $5a$, $5a'$, and $6a$, $6a'$. On the ends of the guide elements are abutting members 7, here shown as rolling abutting members, which engage with the guide faces $4a$, $4a'$ and $4b$, $4b'$. The abutting members of the first guide member 5 are denoted as member $7ar$ and $7al$, while the abutting members on the guide member 5' on the opposite side of the table means are denoted $7a'r$ and $7a'l$, the second subscript denoting the side on which the abutting element is positioned when the guide faces are viewed from the direction remote from the table. Corresponding abutting members $7bl$ and $7br$ and $7b'l$ and $7b'r$ are provided in abutment with the guide faces $4b$ and $4b'$ which are orthogonal to the guide faces $4a$ and $4a'$.

Moving means are provided for each of the guide elements of the guide members, the moving means $6a$ and $6a'$ being provided for the guide elements $5a$ and $5a'$ respectively, and the moving means $6b$ and $6b'$ being provided for the respective guide elements $5b$ and $5b'$. The moving means are mechanisms which are able to move the guide elements $5a$ and $5a'$ and $5b$ and $5b'$, individually. Thus, abutting member $7al$ can be moved toward and away from the guide face $4a$ independently of the abutting member $7ar$.

Figure 2A:
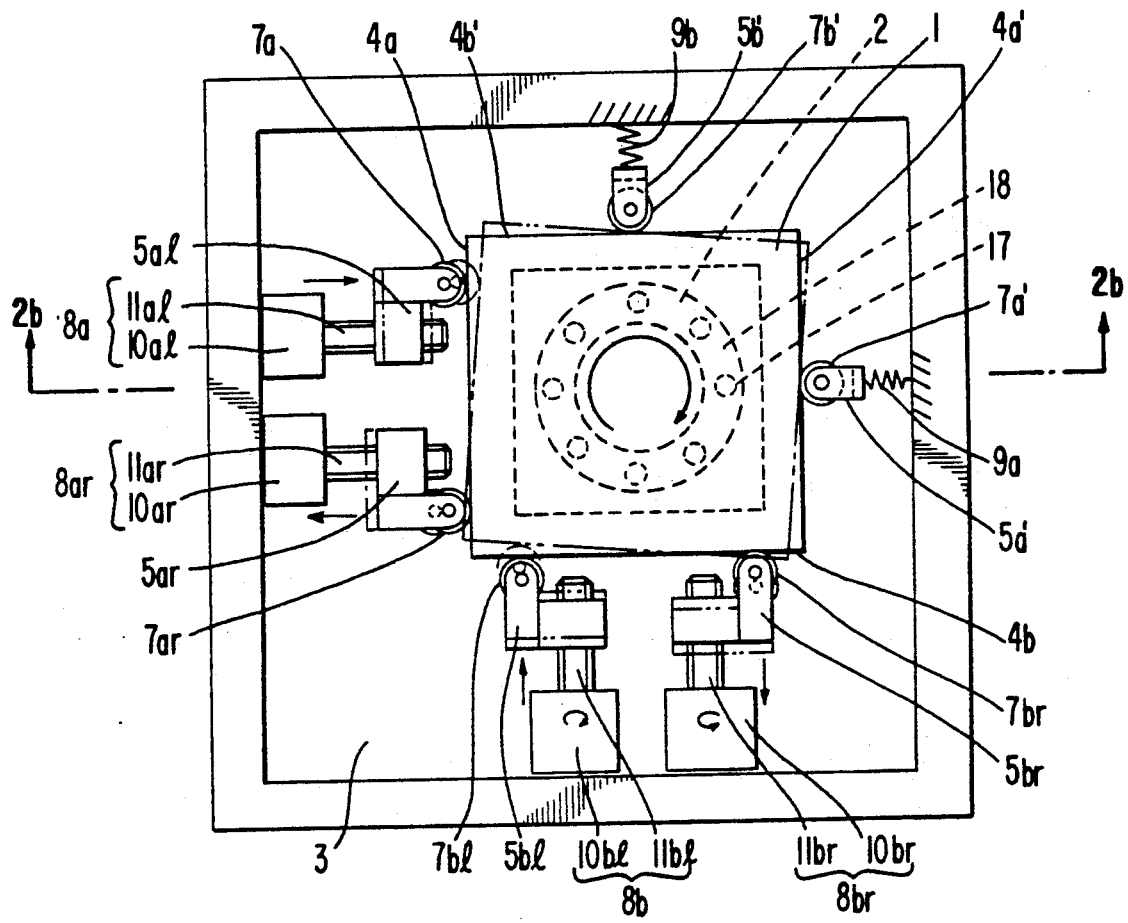
FIG. 2a is a plan view similar to FIG. 1a of a second embodiment of a mechanism according to the invention.
Figure 2B:
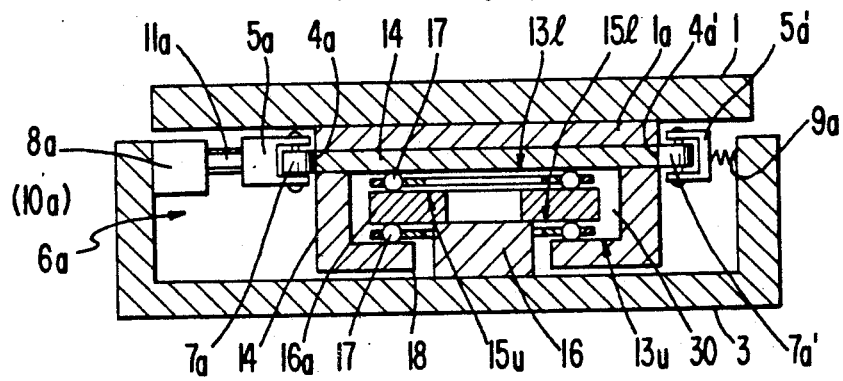

The second embodiment as shown in FIGS. 2a and 2b has the same table means constituted by the table 1 and the table base 1a, and the same support bearing means 30, and the description of the parts of these structures will not be repeated. The structure further includes similar guide members opposed to guide faces $4a$ and $4b$ and having guide elements $5al$ and $5ar$ and guide elements $5bl$ and $5br$, each carrying the corresponding rolling abutting member $7al$, $7ar$, and $7bl$ and $7br$. However, opposed to the guide face $4a'$ on the opposite side of the table means from the guide face $4a$ is a single guide element $5a'$ with a single rolling abutting member $7a'$, and the guide element $5a'$ is supported on the support base 3 by a spring $9a$. A similar element $5b'$, rolling abutting member $7b'$ and spring member $9b$ are on the opposite side of the table means from the guide face $4b$.

Separate moving means $8al$ is provided for guide element $5al$, separate moving means $8ar$ is provided for guide element 5ar, a separate moving means 8bl is provided for guide element 5bl, and separate moving means 8br is provided for guide element 5br. Each of these moving means is constituted by a motor 10, designated with a subscript corresponding to the subscript of the guide element and the moving means, and a threaded shaft 11, likewise designated by the same subscript as the guide element and the moving means. Thus, the respective guide elements 5al and 5ar and 5bl and 5br are able to be moved toward and away from the table means independently of the other.

Figure 4:
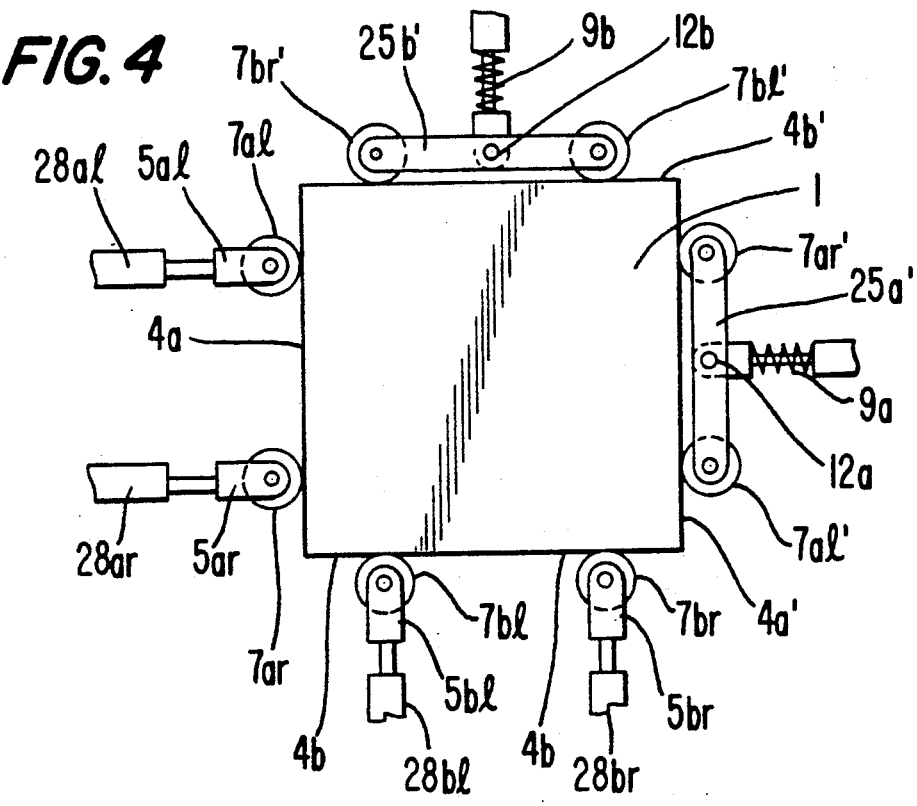
FIG. 4 is a plan view showing a further embodiment of the mechanism of the invention.

A third embodiment is shown in FIG. 4, which differs from that shown in FIGS. 1 and 2 in that a guide element 25a' and a guide element 25b' each have two rolling abutting members thereon, rolling abutting members 7a'l and 7a'r and 7b'l and 7b'r, and the guide elements 25a' and 25b' are pivoted on rocking shafts 12a and 12b on the spring mounts. In addition, the moving means for the guide elements are fluid piston-cylinder devices 28al, 28ar and 28bl, 28br.

Figure 5:
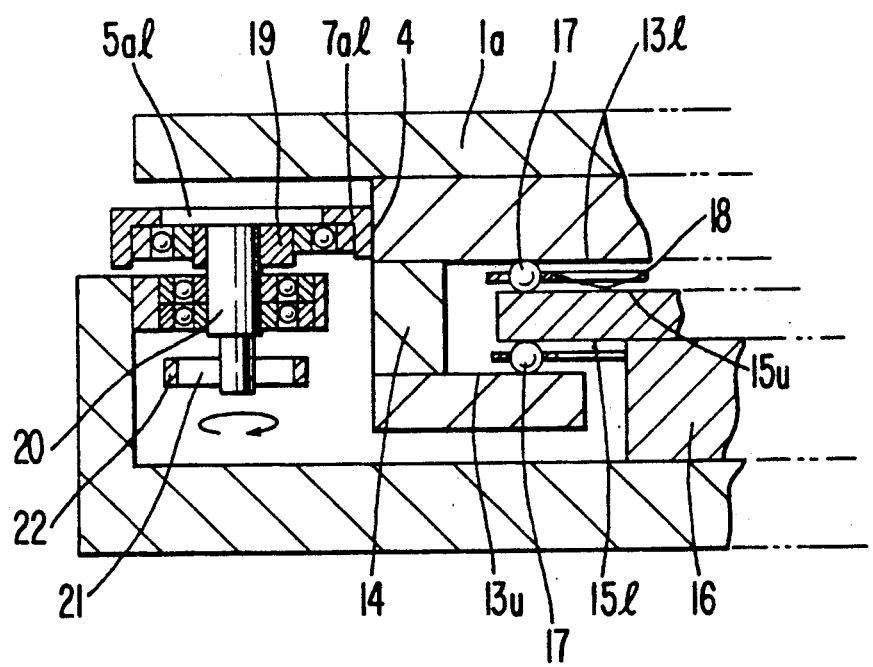
FIG. 5 is a sectional view of an important part of a still further embodiment.

The embodiment of FIG. 5 provides a different moving means, only one of which is shown, and has a simple abutting member 7al which is in slidable abutment with the guide face 4a of the table means, and an eccentric cam 19a engaged with the guide element 5al carrying the abutting member 7al for moving the abutting member toward and away from the table means as the cam 19a is rotated on shaft 20, being driven through a pulley 21 thereon by a belt 22 extending to a drive motor (not shown).

The operation of the mechanism of the present invention is described below in reference to FIGS. 1a, 1b, 2a, 2b, and 3a-3c, showing the first two embodiments.

Figure 3A:
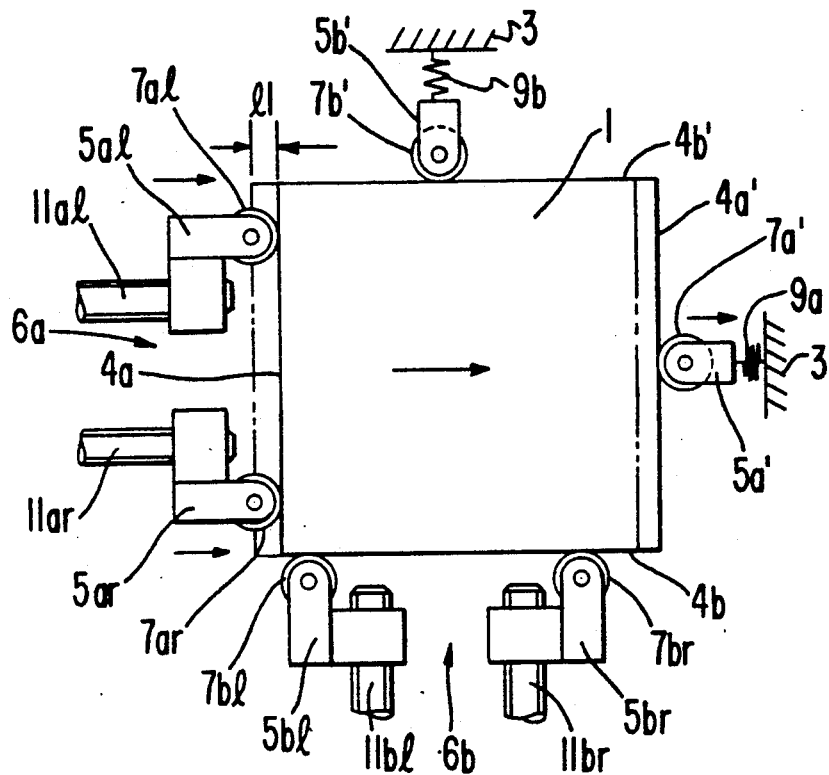
FIGS. 3a, 3b and 3c are plan views showing the operation of the embodiment shown in FIGS. 2a and 2b.

In the structure of FIGS. 2a and 2b, if motors 10al and 10ar driving the guide elements 5al and 5ar which carry abutting elements 7al and 7ar which abut guide face 4a on the left in the drawings are driven in the same direction to turn the threaded shafts 11al and 11ar the same amount, internal thread members (not shown) on the guide elements engaged with the threaded shafts 11al and 11ar move the guide elements 5al and 5ar rightward together in the drawings, to move abutting portions 7al and 7ar an equal distance 11. As a result, as shown in FIG. 3a, the table base 1a, and hence the table 1, is moved rightward in the drawings along the guide faces 4b and 4b' supported by abutting members 7bl, 7br at the bottom and top in the drawing. In this case, the guide face 4a' moves to the right against the abutting member 7a' which in turn moves guide element 5a' to compress spring 9a.

Figure 3B:
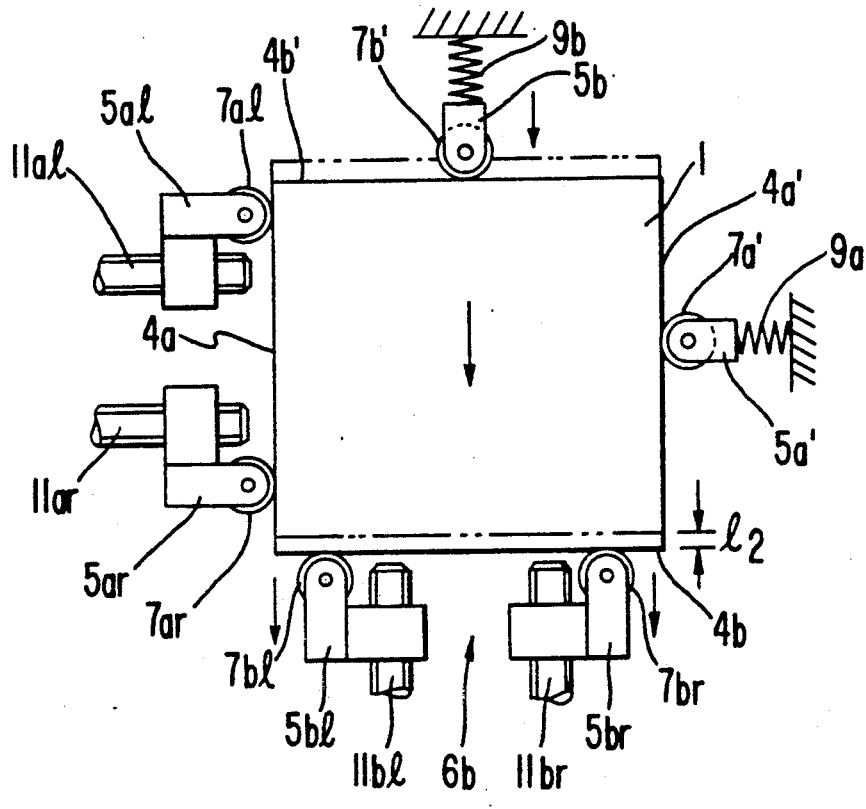
Figure 3:
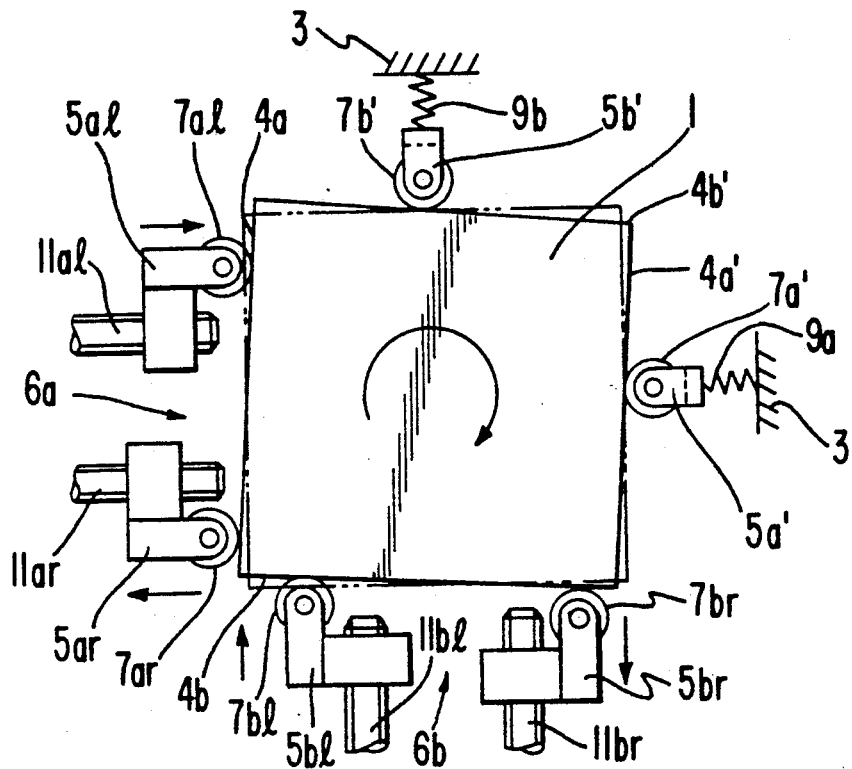

Similarly, if motors 10bl and 10br driving the guide elements 5bl and 5br which carry abutting elements 7bl and 7br which abut a guide guide face 4b at the bottom in the drawing are driven in the same direction to turn threaded shafts 11bl and 11br the same amount, internal thread members (not shown) on the guide elements with the threaded shafts 11bl and 11br move guide elements 5bl and 5br downward in the drawing, to move abutting members 7bl and 7br an equal distance 12. As a result, the table base 1a, and hence table 1, has pressure exerted on guide face 4b' by a spring 9b through the abutting member 7b', and as shown in FIG. 3b, and is moved downward in the drawing along the guide faces 4a and 4a', supported by the abutting members 7al and 7ar and 7a' on both sides.

In the above operation, if the threaded shafts 11al and 11ar are turned reversely, the table 1 can be moved leftward in the drawing, and if the threaded shafts 11bl and 11br are turned reversely, the table 1 can be moved upward in the drawing.

In this way, in the present invention, the table can be moved lengthwise or crosswise thereof by the motion of either guide elements 5a on the left or guide elements 5b at the bottom in the drawing. In addition, both pairs of guide members can be driven simultaneously in the same way to move the table 1 in any combination of the orthogonal directions of guide faces 4a, 4a' and 4b, 4b'.

In addition, the moving means 8al and 8ar on the left and 8bl and 8br at the bottom in the drawing can be interlocked, to advance the left abutting members 7al and 7bl of the respective pairs of the guide elements 5a and 5b toward the guide faces 4a and 4b and to retract the right abutting members 7ar and 7br from the guide faces 4a and 4b as shown by chain lines in FIG. 2a. In this case, the moving means are interlocked to keep the abutting members 7al and 7ar on the left side along a line perpendicular to a line along the abutting members 7bl and 7br at the bottom in the drawing.

In the above interlocked operation, the table 1 is pressed at the left ends of the respective guide faces 4a and 4b, and is turned clockwise as shown in FIG. 3c, with the guide faces 4a' and 4b' respectively on the right and at the top in the drawing supported by pressure contact with the springs 9a and 9b through the respective abutting members 7a' and 7b'. On the other hand, if interlocked operation is carried out to advance the right abutting members 7ar and 7br of the pairs of guide elements 5a and 5b toward the guide faces 4a and 4b and to retract the left abutting members 7al and 7bl from said guide faces, the table can be turned counterclockwise in the drawing.

As described above, in the mechanism of the present invention, the two mutually orthogonal pairs of guide faces 4a, 4a' and 4b, 4b' on the support bearing means 30 for movement lengthwise, crosswise and in a turning direction thereof can be pressed by the abutting members abutting against said guide faces to move the table 1 lengthwise.

In the embodiment of FIGS. 2a and 2b, the moving means for the guide elements 5a is a feed mechanism including a threaded shaft engaging an internally threaded member and turned by a motor. However, it can also be constituted by any other appropriate means, for instance, the hydraulic or pneumatic cylinders devices 28al, 28ar and 28bl, 28br shown in FIG. 4, or by eccentric cam mechanisms, one of which is shown in FIG. 5. In the embodiment of FIGS. 2a and 2b, the guide elements 5a' and 5b' are supported by the springs 9a and 9b instead of a moving means and have only one abutting member 7a' or 7b' each, to allow the guide faces 4a' and 4b' of the table 1 to be rocked with the respective abutting members as fulcrums. However, it is also possible, as shown in the embodiment of FIG. 4, to provide two or more abutting members 7al and 7ar on elongated guide elements 25a' and 25b' pivoted on the rocking shafts 12a and 12b where they are supported by the spring, for allowing rocking around rocking shafts 12a and 12b. Furthermore, it is also possible, as shown in the embodiment of FIG. 1, to provide guide members 5a' and 5b' for the respective abutting members 7al' and 7ar'. Moreover, it is possible, as shown in the embodiment of FIG. 1, to provide the moving means 6a and 6a' and 6b and 6b' for all the guide elements 5a, 5a' and 6a, 6a' on both sides of the table means, and to have them operate synchronously to produce the lengthwise and crosswise movement and the turning movement of the table 1.

The bearings 17 shown in FIGS. 1b and 2b are ball bearings, but can be any suitable bearings such as roller bearings or fluid bearings, as long as they allow the table 1 to move lengthwise, crosswise and in a turning direction. In the embodiments shown in FIGS. 1a, 1b, 2a, 2b and 5, the bearing support member 14 with the support face 13l and support face 13u is provided below the table base 1a, and a post 16 with a flange 16a having an upward facing support face 15u and a downward facing support face 15l corresponding to said respective support faces 13l and 13u is mounted on the support base 3. The ball bearings 17 held by the bearing races 18 each are set between the support faces respectively. In this structure, the vertical movement of the table can be prevented so as to provide positive support.

In the mechanism of the present invention, the two mutually orthogonal pairs of parallel guide faces 4a, 4a' and 4b, 4b' can be provided at appropriate locations on the table means as described above. For instance, they can be formed on the table base 1a below the table 1, or the end faces of the table 1 itself can be used as the guide faces.

EFFECTS OF THE INVENTION

By the mechanism of the present invention, as described above, a table forming part of a table means is supported for movement lengthwise, crosswise and in a turning direction thereof on a support bearing means, and two mutually orthogonal pairs of parallel guide faces are provided on the table means. Furthermore, guide elements hold abutting members against said guide faces for controlling such movement of the table and moving means are connected to the guide elements for moving the guide elements for causing the table to make such movements. Thus, since it is not required to superpose the two orthogonal guide bearing mechanisms for lengthwise and crosswise movement and a turning mechanism for turning movement, the height from the support base to the table can be decreased, the table can be stably moved lengthwise, crosswise and in a turning direction, the space occupied by the mechanism, the number of parts used and the man hours for assembling can be reduced, and assembly accuracy can be easily attained.

What is claimed is:

1. A mechanism for moving a table means having a table as a part thereof in the lengthwise and crosswise directions and for providing turning movement of the table, said mechanism comprising:
   a support base;
   support bearing means on said support base for supporting the table means during movement in the lengthwise and crosswise directions relative to said support base and during turning movement of the table relative to said support base and for preventing vertical movement of the table relative to said support base;
   two mutually orthogonal pairs of parallel guide faces adapted to be mounted on the table means;
   guide members on opposite sides of the table means and engaged with said guide faces for controlling the movement of the table means in the lengthwise and crosswise directions and for controlling turning movement of the table; and
   moving means connected to at least some of said guide members for moving appropriate ones of said guide members for causing movement of the table means along the other of said guide members in the lengthwise and crosswise directions of the table and in turning movement of the table.

2. A mechanism as claimed in claim 1 in which at least two of said guide members respectively engage at least two of said guide faces which are orthogonal to each other, each of said at least two of said guide members comprising two guide elements having abutting members thereon abutting said guide faces, and said moving means is connected to said at least two of said guide members respectively engaging said at least two of said guide faces which are orthogonal to each other and is operable for moving said guide elements independently of each other toward and away from said guide faces such that when said moving means moves both said guide elements in unison, the table means is moved in the orthogonal direction to the guide face abutted by the abutting members, and when said moving means moves one of said guide elements toward the guide face and retracts the other guide element away from the guide face, the table means is turned.

3. A mechanism as claimed in claim 2 in which each of said guide members is engaged with a respective one of said guide faces and comprises two guide elements having abutting members thereon abutting said guide faces, and said moving means is connected to all of said guide elements.

4. A mechanism as claimed in claim 2 in which each of said guide elements which is engaged with the guide faces on opposite sides of the table means from the guide faces engaged by said at least two of said guide elements comprises a single guide element means and a spring means mounted on said support base for biasing said single guide element means toward the table means.

5. A mechanism as claimed in claim 4 in which each of said single guide element means comprises a guide element having a pair of spaced apart abutting members for engaging a respective one of said guide faces, said guide element being rockably mounted on said spring means.

6. A mechanism as claimed in any one of claims 2-4 in which said moving means comprises an individual moving means for each guide element, each of said individual moving means comprising a motor and a threaded shaft driven by said motor and threadedly engaged with the corresponding guide element.

7. A mechanism as claimed in any one of claims 2-4 in which said moving means comprises an individual moving means for each guide element, each of said individual moving means comprising a fluid piston cylinder means.

8. A mechanism as claimed in any one of claims 2-4 in which said moving means comprises an individual moving means for each guide element, each of said individual moving means comprising a cam mechanism.

9. A mechanism as claimed in claim 1 in which said support bearing means comprises a post mounted to and extending upwardly from said support base, a radially outwardly extending flange mounted to a top end of said post, upper bearing means for bearing between an upwardly facing support face of said flange and a downwardly facing support face of the table means, and a lower bearing means for bearing between a downwardly facing support face of said flange and an upwardly facing support face of the table means.

10. A mechanism as claimed in claim 9 in which each of said upper and lower bearing means comprises a plurality of ball bearings mounted in a bearing race.

* * * * *